United States Patent
Varoquie

(10) Patent No.: US 9,845,771 B2
(45) Date of Patent: Dec. 19, 2017

(54) METHOD FOR DETERMINING THE RECYCLED AIR FLOW RATE AND THE QUANTITY OF OXYGEN AVAILABLE AT THE INLET OF AN INTERNAL COMBUSTION ENGINE CYLINDER

(71) Applicants: CONTINENTAL AUTOMOTIVE FRANCE, Toulouse (FR); CONTINENTAL AUTOMOTIVE GMBH, Hannover (DE)

(72) Inventor: Bertrand Varoquie, Eaunes (FR)

(73) Assignees: CONTINENTAL AUTOMOTIVE FRANCE, Toulouse (FR); CONTINENTAL AUTOMOTIVE GmbH, Hannover (DE)

( * ) Notice: Subject to any disclaimer, the term of this patent is extended or adjusted under 35 U.S.C. 154(b) by 233 days.

(21) Appl. No.: 14/653,028

(22) PCT Filed: Dec. 18, 2013

(86) PCT No.: PCT/EP2013/003826
§ 371 (c)(1),
(2) Date: Jun. 17, 2015

(87) PCT Pub. No.: WO2014/095052
PCT Pub. Date: Jun. 26, 2014

(65) Prior Publication Data
US 2015/0330334 A1    Nov. 19, 2015

(30) Foreign Application Priority Data
Dec. 18, 2012  (FR) ..................................... 12 62223

(51) Int. Cl.
G01M 15/08    (2006.01)
F02M 25/07    (2006.01)
(Continued)

(52) U.S. Cl.
CPC ....... *F02M 25/0754* (2013.01); *F02D 35/023* (2013.01); *F02D 35/025* (2013.01);
(Continued)

(58) Field of Classification Search
USPC ............... 73/114.16, 114.32, 114.33, 114.69, 73/114.76
See application file for complete search history.

(56) References Cited

U.S. PATENT DOCUMENTS

2002/0033045 A1* 3/2002 Ludwig .................. F02M 26/49
                                                          73/114.76
2011/0315115 A1  12/2011 Flik et al.
(Continued)

FOREIGN PATENT DOCUMENTS

CN        102297744 A    12/2011
CN        102486143 A    6/2012
(Continued)

OTHER PUBLICATIONS

International Search Report, dated Jun. 4, 2014, from corresponding PCT application. PCT/EP2013/003826.

*Primary Examiner* — Eric S McCall
(74) *Attorney, Agent, or Firm* — Young & Thompson

(57) ABSTRACT

A method for determining the recycled air flow rate and oxygen quantity at the inlet of an internal combustion engine cylinder. The method involves measuring pressure in each cylinder during a compression phase and calculating the mass of gas in each cylinder based on the measured pressure, volume and temperature variation for an angular variation of the crankshaft, heat capacity, and heat losses. The method further involves determining the mass of gas in all cylinders over a full combustion cycle as well as in the recycled exhaust.

16 Claims, 6 Drawing Sheets

(51) Int. Cl.
- *F02D 41/00* (2006.01)
- *F02D 35/02* (2006.01)
- *F02M 26/47* (2016.01)

(52) U.S. Cl.
CPC ......... *F02D 41/0072* (2013.01); *F02M 26/47* (2016.02); *F02D 2200/0402* (2013.01); *Y02T 10/47* (2013.01)

(56) References Cited

U.S. PATENT DOCUMENTS

| | | |
|---|---|---|
| 2012/0138028 A1 | 6/2012 | Nam et al. |
| 2014/0144219 A1* | 5/2014 | Narita ................ F02M 25/0702 73/114.74 |

FOREIGN PATENT DOCUMENTS

| | | |
|---|---|---|
| DE | 102009037272 A1 | 2/2011 |
| DE | 102011013481 A1 | 9/2012 |
| FR | 2835281 A1 | 8/2003 |
| GB | 2333159 A | 7/1999 |
| JP | 08284735 A | 10/1996 |
| JP | 2010106734 A | 5/2010 |
| WO | 2008109306 A1 | 9/2008 |

* cited by examiner

METHOD FOR DETERMINING THE RECYCLED AIR FLOW RATE AND THE QUANTITY OF OXYGEN AVAILABLE AT THE INLET OF AN INTERNAL COMBUSTION ENGINE CYLINDER

FIELD OF THE INVENTION

The present invention relates to a method for determining the recycled air flow rate and the quantity of oxygen at the inlet of an internal combustion engine cylinder.

The field of the present invention lies in the control and management of internal combustion engines, and more particularly compression-ignition engines, also referred to as diesel engines.

BACKGROUND OF THE INVENTION

In an engine of the diesel type air is compressed in a combustion chamber, then fuel is injected under pressure into said chamber. The temperature and pressure conditions in the chamber are such during the injection that there is then combustion of the fuel. This combustion is performed under high pressure and at high temperature and generates the production of polluting gases of the nitrogen oxide type, in particular comprising nitrogen monoxide NO, nitrogen dioxide $NO_2$, etc., more generally known under the name $NO_x$.

In order to limit in particular the polluting emissions of an engine of the diesel type it is known to equip the engine with at least one recirculation circuit. An internal combustion engine is supplied with fresh air and rejects waste gases at the exhaust. For engines of the diesel type it has been found that by mixing some of the waste gases with the fresh air supplying the engine it was possible to influence, or more precisely to reduce, the polluting emissions at the exhaust. A circuit for recirculation of waste gases is commonly referred to as an EGR (exhaust gas recirculation) circuit. Low-pressure or high-pressure EGR circuits exist depending on whether the exhaust gases are drawn at high pressure, that is to say in the proximity of the exit of the gases from the cylinders, or after decompression of the gases further downstream of the cylinders.

In an engine of the diesel type comprising an EGR circuit the air that re-enters the cylinders thus originates in part from the exterior (fresh air) and in part from the EGR circuit (waste gases). A flowmeter is used to measure the flow rate of fresh air admitted into the engine, but the flow rate of recycled gas is not measured. However, it is beneficial to know on the one hand the rate of recirculation gas and on the other hand the content of oxygen of the gaseous mixture entering the cylinders in order to control and manage the engine, in particular so as to order the opening and the closing of the valves of the EGR circuit(s). These parameters (EGR rate and oxygen content) also have an influence on the torque limitation of the engine and the estimation of $NO_x$ emissions.

In the known engines, as indicated above, the recycled gas flow rate is not measured by a flowmeter or the like. Information concerning the EGR flow rate and concerning the oxygen content is then obtained on the basis of models that are not very robust and that involve complex calibration and/or with the aid of an oxygen probe, of which the cost price is very high.

Document DE 10 2011 013 481 A1 is known and concerns a method for calculating the temperature in the combustion cycle. The temperature is determined in the phase of valve overlap. The residual mass of waste gases is calculated as well as a reference temperature. It is necessary to know the temperature during the valve overlap and during the opening of the intake valve. This document teaches a method according to the perfect fluid model.

Document DE 10 2009 037 272 A1 is also known and concerns a method for operating an internal combustion engine, said method being based on a perfect gas model.

SUMMARY OF THE INVENTION

The object of the present invention is then to provide a method that makes it possible to know reliably the rate of recirculation gas at the inlet of at least one internal combustion engine cylinder, in particular an engine of the diesel type, without the need for an oxygen probe.

The method according to the present invention advantageously will make it possible also to access the oxygen content at the inlet of at least one cylinder of the engine in question and also possibly at the exhaust.

To this end the present invention proposes a method for determining a waste gas recirculation flow rate in a flow of air in an internal combustion engine comprising at least one cylinder equipped with a pressure sensor, said engine comprising at least one waste gas recirculation circuit as well as means making it possible to measure the flow rate of fresh air introduced into the engine.

In accordance with the present invention said method comprises the following steps:
  measuring the pressure in each cylinder during a compression phase whilst no quantity of gas can enter or exit from said cylinder on the one hand and before fuel is injected into said cylinder on the other hand,
  determining the mass of gas present in each cylinder in question, on the basis of the quotient on the one hand of the product of the pressure in the cylinder multiplied by the variation of volume in the cylinder and by a corrective term and on the other hand of the product of the variation of temperature in the cylinder and of the heat capacity at constant volume of the gaseous mixture according to the following formula:

$$\text{MAF\_CYL} = \left[ Pcyl \times \frac{dV}{d(crk)} \times \frac{\alpha - 1}{CV} \right] \bigg/ \frac{dTcyl}{d(crk)}$$

where:
MAF_CYL is the mass of gas in the cylinder in question,
Pcyl is the pressure measured in the cylinder,
dV/d(crk) is the variation of volume in the cylinder for an angular variation of the crankshaft equal to d(crk),
dTcyl/d(crk) is the variation of temperature in the cylinder for an angular variation of the crankshaft equal to d(crk),
CV is the heat capacity at constant volume of the mass of gas,
$\alpha-1$ is said corrective term representing the heat losses taken into consideration,
determining the mass of gas present in all the cylinders of the engine over a full combustion cycle,
determining the mass of gas corresponding to the recycled exhaust gas as being the difference between the mass of gas present in the cylinders and determined during the previous step on the one hand and the mass of fresh air measured by the means making it possible to measure the fresh air flow rate corresponding to the same full combustion cycle on the other hand.

The method proposed by the present invention thus makes it possible to know the mass of gas originating from an exhaust gas recirculation system on the basis of the pressure in the cylinders of the engine (and on the basis of "basic" information available in any modern engine). There is thus no need to provide an oxygen probe in the engine when said engine is equipped with pressure sensors in the cylinders. The method according to the invention makes it possible to take into consideration thermal losses in the cylinder, taking into consideration actual fluids and not perfect fluids, thus improving the accuracy of the calculation of the mass of gas in the cylinder in question as well as the accuracy of the calculation of the mass of gas corresponding to the recycled exhaust gas. The calculation of the aspirated gaseous mass is deduced from a balance of energy over the compression phase.

In a method according to the invention, in order to obtain results that are more precise, the pressure is preferably measured during a compression phase of the gaseous mixture, in a range of angular rotation of the engine between 70° and 30°, preferably between 60° and 40°, before the top dead center corresponding to the end of the compression phase. In fact, in the predefined range, the heat capacity at constant volume of the gaseous mixture contained in the cylinder is virtually independent of the rate of exhaust gas contained in the compressed mixture. This property is very useful here and the present invention proposes using this property here in an original manner.

In order to increase the calculation accuracy in a determination method according to the invention it is proposed for the mass of gas in a cylinder to be determined by taking a number of measurements of pressure at different angular positions of the engine and by calculating the arithmetic mean of the results corresponding to the measurements taken.

The present invention proposes that the corrective term used for the calculation of the mass of gas in a cylinder is a function of the speed of rotation of the engine and of the temperature thereof. A table with two entries thus makes it possible to quickly define the corrective term.

The present invention, thanks in particular to the improved knowledge of the flow rate of the gases in the exhaust gas recirculation system provided by the invention, also proposes providing information concerning oxygen contents in the engine. Thus, a determination method according to the present invention will advantageously also comprise a step of determining the oxygen content of a gaseous mixture in the engine.

A step of determining the mass fraction of oxygen in a cylinder before the start of the combustion can be provided and is such that this mass fraction is obtained with the aid of the following formula:

$$YO2IN_{cyl} = 0.23 - \left( \frac{MF}{MF + MAF_{cyl}} \times C_F \times \frac{MEGR_{kgh}}{MAF_{kgh}} \times \frac{1}{n_{cyl}} \right)$$

where:
MF is the total mass of injected (and/or) burned fuel (which for example may be either an estimation made on the basis of the total mass required by the engine control or a measurement using other information (lambda/oxygen probe or cylinder pressure sensor)),
$MAF_{cyl}$ is the mass of gas for the cylinder in question,
$C_F$ is the stoichiometric ratio of air/fuel for the selected fuel, $MEGR_{kgh}$ is the gaseous flow rate in the exhaust gas recirculation system,
$MAF_{kgh}$ is the flow of fresh air measured at the inlet of the engine (by the means making it possible to measure the flow rate of fresh air introduced into the engine), and
$n_{cyl}$ is the number of cylinders of the engine.

It is also proposed by the present invention that the method according to the invention comprises a step of determining the mass fraction of oxygen in a cylinder at each angular position in the combustion cycle:

$$YO2_{cyl} = YO2IN_{cyl} - \left( \frac{MF_{cyl}}{MF_{cyl} + MAF_{cyl}} \times C_{OF} \right)$$

By applying this formula at the end of the combustion cycle, the mass fraction of oxygen in the waste gases is given with the aid of the following formula:

$$YO2EX_{cyl} = YO2IN_{cyl} - \left( \frac{MF}{MF + MAF} \times C_{OF} \right)$$

where:
$YO2IN_{cyl}$ is the mass fraction of oxygen in the cylinder in question before the start of the combustion,
$MF_{cyl}$ is the mass of burned fuel in the cylinder at each angular position,
$MAF_{cyl}$ is the mass of gas for the cylinder in question at each angular position,
MAF is the mass of gas for the cylinder in question and for the cycle in question, and
$C_{OF}$ is the stoichiometric ratio of oxygen/fuel for the selected fuel.

The present invention lastly relates to a device for determining an exhaust gas recirculation flow rate in an air flow in an internal combustion engine comprising at least one cylinder equipped with a pressure sensor, said engine comprising at least one exhaust gas recirculation circuit as well as means making it possible to measure the flow rate of fresh air introduced into the engine, characterized in that said device comprises means for implementing each of the steps of a method as described above.

The present invention also relates to a device for managing and controlling an internal combustion engine, characterized in that said device comprises means for implementing each of the steps of a method as presented above.

BRIEF DESCRIPTION OF THE DRAWINGS

Details and advantages of the present invention will become clearer upon reading the following description, which is provided with reference to the schematic accompanying drawings, in which.

DETAILED DESCRIPTION OF THE INVENTION

Figure 1:
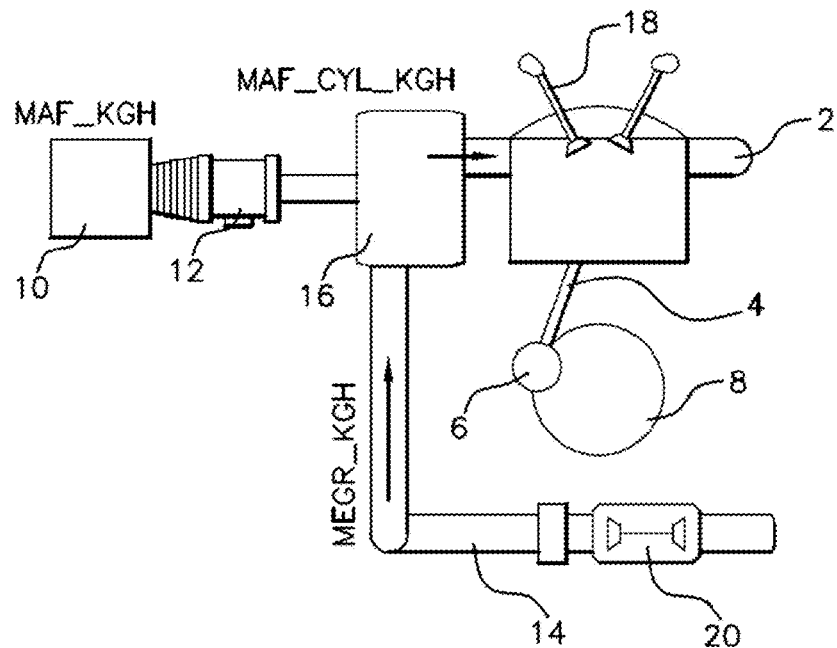
FIG. 1 is a partial schematic view of an engine illustrating the air supply system of a cylinder.

FIG. 1 schematically illustrates a cylinder 2 inside which a piston is driven, said piston being connected by a piston rod 4 to a crankshaft 6 carrying a flywheel 8. The angular position of the flywheel 8 is used as a parameter for determining numerous commands in the management of an engine. In the case of an internal combustion engine of which the combustion cycle has four strokes, the position of the mechanical components of the engine is determined over two revolutions of the flywheel 8, that is to say over 720°. It is assumed in the following description, for the sake of clarity and in a non-limiting manner, that the engine in question is a four-stroke engine of the diesel type (that is to say a compression-ignition engine) comprising four cylinders.

A manifold 10 is provided as the fresh air inlet of the engine in question. A regulator 12 making it possible to adapt the flow rate of fresh air supplying the engine is arranged downstream of this manifold 10.

The engine considered here is also equipped with an exhaust gas recirculation system, referred to commonly as an EGR (exhaust gas recirculation) system. A recirculation pipe 14 leads into an intake manifold 16 downstream of the regulator 12 and just upstream of the inlet of the cylinder 2, said inlet being controlled by at least one intake valve 18. A control valve 20 influences the flow rate of exhaust gas in the recirculation pipe 14 in a conventional manner.

The following abbreviations will be used hereinafter:

MAF a mass of fresh air,

MAF_KGH a flow rate of fresh air in the manifold 10 (in kg/h for example),

MAF_CYL a gaseous mass in the cylinder in question,

MAF_CYL_KGH a total gaseous flow rate aspirated into the cylinders (in kg/h for example), MEGR_CYL a gaseous mass originating from the recirculation pipe 14 in the cylinder in question, MEGR_KGH a gaseous flow rate in the recirculation pipe 14.

It is assumed here that each cylinder 2 of the engine is equipped with a pressure sensor 22 (FIG. 3), which provides a signal Pcyl(crk) corresponding to the pressure measured for an angular position crk of the engine. A unique feature of the method proposed here is that it makes it possible to determine reliable information concerning the quantity of recycled air in the cylinder in question on the basis of the information provided by this sensor.

The signal Pcyl(crk) is filtered by a filter 24 in order to obtain a value Pcyl that can be used in a calculator. This signal Pcyl(crk) is also transmitted to a processing device intended to provide, on the basis of the information received (the signal of the pressure sensor), information concerning the temperature in the cylinder in question. This device is referred to as a temperature module 26 in the description below.

The temperature module 26 determines the temperature in the cylinder in question in the following way. For a given quantity of gas, the quotient PV/T is constant, P representing the pressure of the gas, V the volume thereof and T the temperature thereof. By taking as reference the volume of gas (air) introduced into the combustion chamber, the following equation is thus obtained:

$$P_{in}V_{in}/T_{in}=P\text{cyl}(\text{crk})V(\text{crk})/T\text{cyl}(\text{crk})$$

where:

$P_{in}$ is the pressure of the air at the inlet of the combustion chamber measured for example upon closure of the intake valve 18, that is to say for crk=IVC, $V_{in}$ corresponds to the volume of the combustion chamber during the measurement of the pressure $P_{in}$, $T_{in}$ corresponds to the temperature of the air that penetrates the combustion chamber during the pressure measurement $P_{in}$.

This therefore gives:

$$T\text{cyl}(\text{crk})=P\text{cyl}(\text{crk})V(\text{crk})T_{in}/P_{in}V_{in}$$

This relation thus makes it possible to know, for each pressure measurement in the cylinder, the corresponding temperature since the variation of the volume in relation to the position of the crankshaft is known.

The data at the end of the temperature module, Tcyl(crk), is also introduced into the filter 26, which then provides a value Tcyl at the end.

On the basis of this data it is proposed to calculate the mass MAF_CYL of gas present in the cylinder 2 in question. Proceeding from the preservation of the quotient PV/T at constant volume and with derivation of the expression, the following formula is given:

$$mc_v dT/dt=-PdV/dt$$

m being a mass of gas, $c_v$ being a heat capacity at constant volume, T being a temperature, P being a pressure, V being a volume and t being a time variable.

This formula is then applied here. The mass corresponds to the mass of gas in the cylinder 2, that is to say MAF_CYL. The heat capacity at constant volume of the gaseous mixture will be referred to hereinafter as CV. The temperature is the temperature in the cylinder, that is to say Tcyl. The pressure is the pressure measured by the pressure sensor 22 and the volume is the volume of the cylinder (which is dependent on the angular position of the engine). The variation of time, at constant rotational speed, is proportional to the variation of angular position of the engine. In the present application, the following equation is thus given:

$$\text{MAF\_CYL}\cdot CV\cdot dT\text{cyl}/d(\text{crk})=-P\text{cyl}\cdot dV/d(\text{crk})$$

It is clear that this equation is valid for a given quantity of gas. It is assumed here that the combustion chamber is closed, that no fuel is injected, and that no combustion is underway.

The right part of this equation corresponds to the work in the cylinder, but without taking into consideration the thermal losses that take place. In order to take into account these losses, a coefficient α is introduced. The following equation is thus obtained:

$$\text{MAF\_CYL}\cdot CV\cdot dT\text{cyl}/d(\text{crk})=-P\text{cyl}\cdot dV/d(\text{crk})(1-\alpha)$$

From which it is possible to deduce:

$$\text{MAF\_CYL} = \left[ P\text{cyl} \times \frac{dV}{d(\text{crk})} \times \frac{\alpha-1}{CV} \right] \bigg/ \frac{dT\text{cyl}}{d(\text{crk})}$$

where:

α is a coefficient that is dependent on the speed of rotation N of the engine as well as the temperature $T_{CO}$ thereof.

The thermal losses are then modeled in a form proportional to the work provided in the compression phase.

Figure 3:
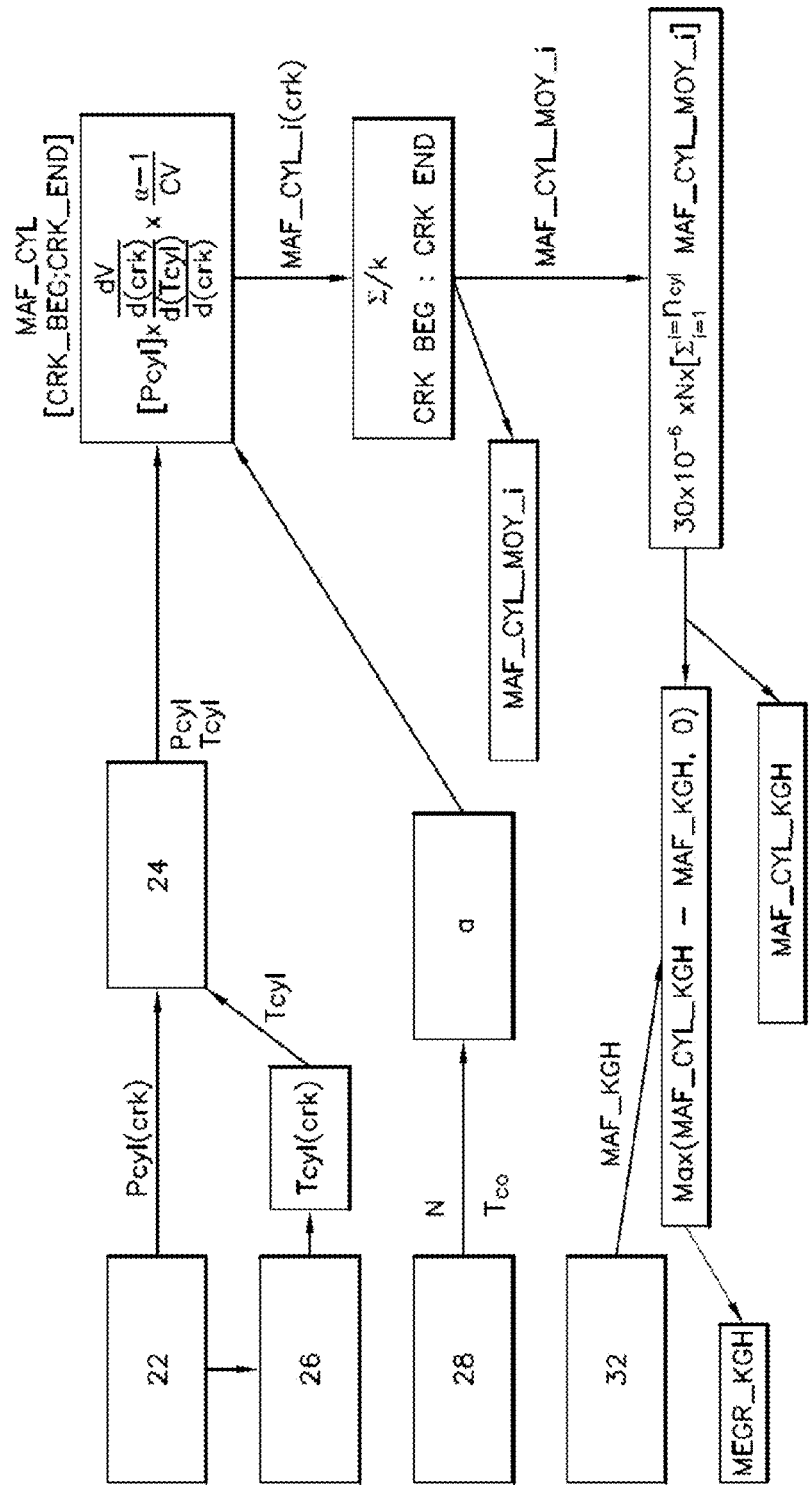
FIG. 3 illustrates a method for determining various gaseous flow rates in the engine illustrated schematically in FIG. 1.

FIG. 3 schematically illustrates a piece of software 28, integrated for example in a microprocessor, that receives information concerning the speed of rotation N of the engine and concerning the temperature $T_{CO}$ thereof. Sensors intended to provide this information are present in all modern engines because this information is indispensable in order to ensure good engine management. The software 28 calculates the coefficient of correction α on the basis of this information. A calibration is provided in order to obtain the values necessary for the calculation of the correction coefficient α.

A measurement of the mass of gas contained in the cylinder 2 is thus obtained on the basis of a measurement of pressure in the cylinder in question.

Figure 8:
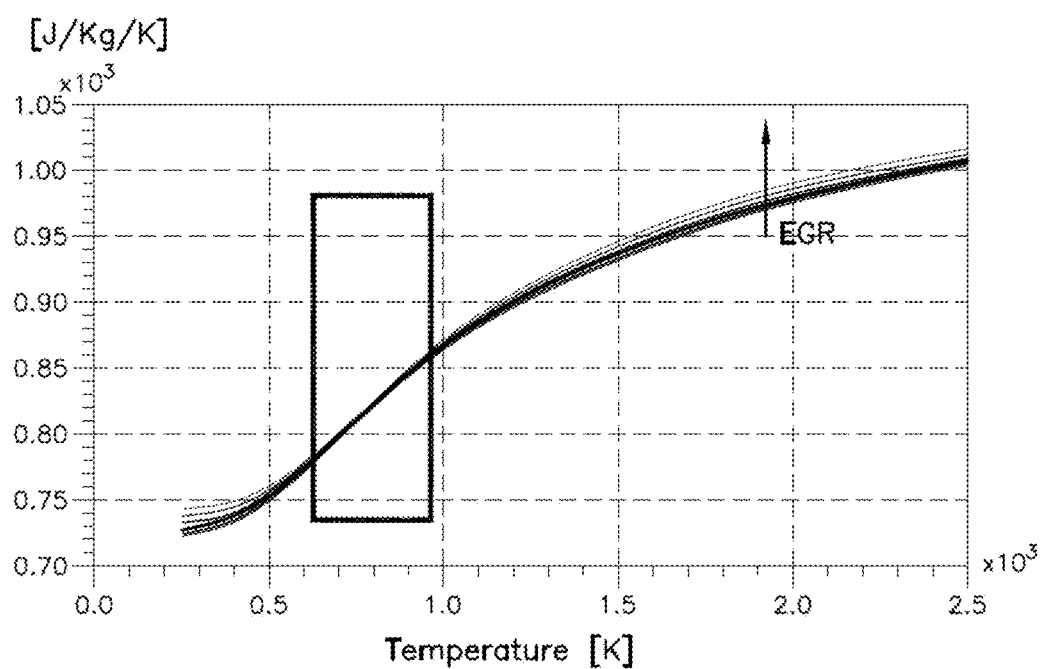
FIG. 8 illustrates the variations of the heat capacity at constant volume of a gaseous mixture supplying a cylinder of an engine depending on the composition of this gaseous mixture.

FIG. 8 illustrates over a wide range of temperatures the variations of the coefficient CV on the one hand as a function of the temperature and on the other hand as a function of the composition of the gaseous mixture contained in the cylinder 2. The different curves of FIG. 8 correspond to more or less elevated rates of exhaust gas. The arrow denoted EGR indicates the direction of increase of the proportion of exhaust gas in the gaseous mixture.

In FIG. 8 a zone can be seen, indicated by a rectangle, in which all the curves are virtually confused, which signifies that the coefficient CV (that is to say the heat capacity of the gaseous mixture at constant volume) is independent of the proportion of exhaust gas in the gaseous mixture located in the cylinder 2.

It is proposed here to utilize this characteristic and to take measurements in the range of temperatures corresponding to the zone illustrated in FIG. 8. In an engine of the diesel type this zone is between approximately −70° and −30° before the arrival of the piston at the top dead center corresponding to the injection of fuel into the cylinder 2.

In order to obtain better precision, it is proposed to take a number of pressure measurements in the given range and then to calculate the average of the values obtained in order to calculate a mass of the gaseous mixture located in the cylinder 2 before the start of the injection of fuel thereinto.

Figure 2:
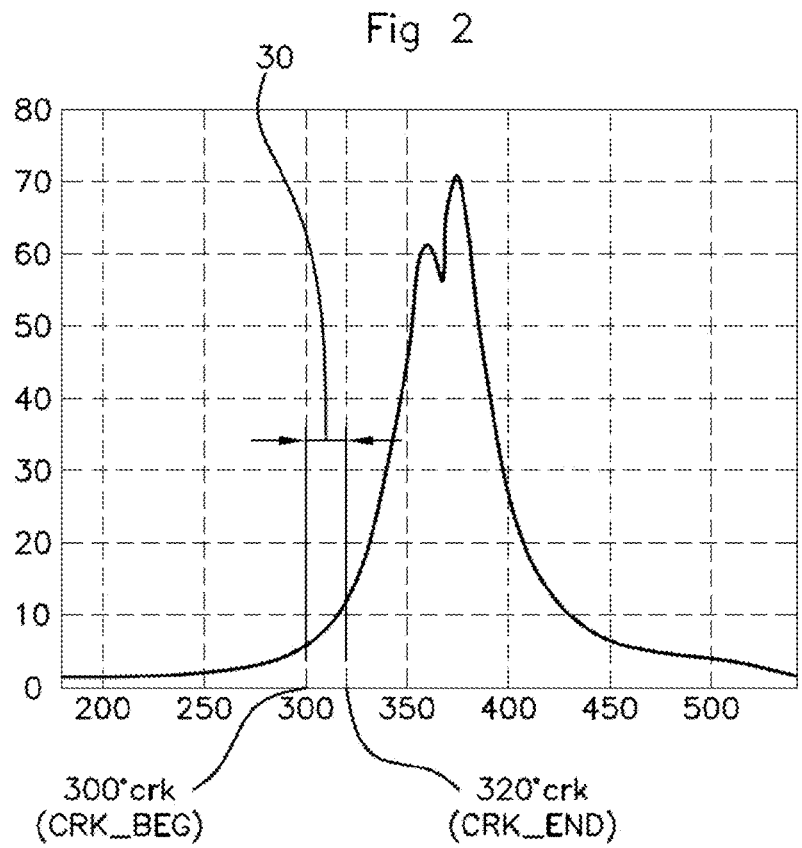
FIG. 2 is a curve illustrating a variation of pressure in a cylinder of an engine.

FIG. 2 illustrates a pressure curve as a function of the angular position of the engine. It is assumed here that the top dead center corresponding to the injection is realized at 360°. The measurement range or window 30 will then be realized between the angular positions CRK_BEG and CRK_END of the flywheel 8. In this case the following may be given, for example:

CRK_BEG=300° and

CRK_END=320°.

It is proposed to take a pressure measurement at regular intervals over this angular range or window. A value MAF_CYL as explained above is determined on the basis of each measurement. A value MAF_CYL_i(crk) is then obtained for each measure corresponding to the cylinder i.

In order to determine the mass of the gaseous mixture in the cylinder i, the arithmetic mean of all the values MAF_CYL_i(crk) is calculated and is then referred to as MAF_CYL_MOY_i, that is to say:

$$\text{MAF\_CYL\_MOY\_i} = \left( \sum_{CRK\_BEG}^{CRK\_END} \text{MAF\_CYL\_i(crk)} \right) \Big/ k$$

with k corresponding to the number of measurements taken over the interval [CRK_BEG; CRK_END].

By way of a simply illustrative numerical example, a pressure measurement (and the corresponding calculations) can be taken every 2° for example. Eleven values (if the measurements are taken between 300° and 320°) will then be obtained and will be added together, the result obtained from the addition being divided by eleven.

Figure 4:
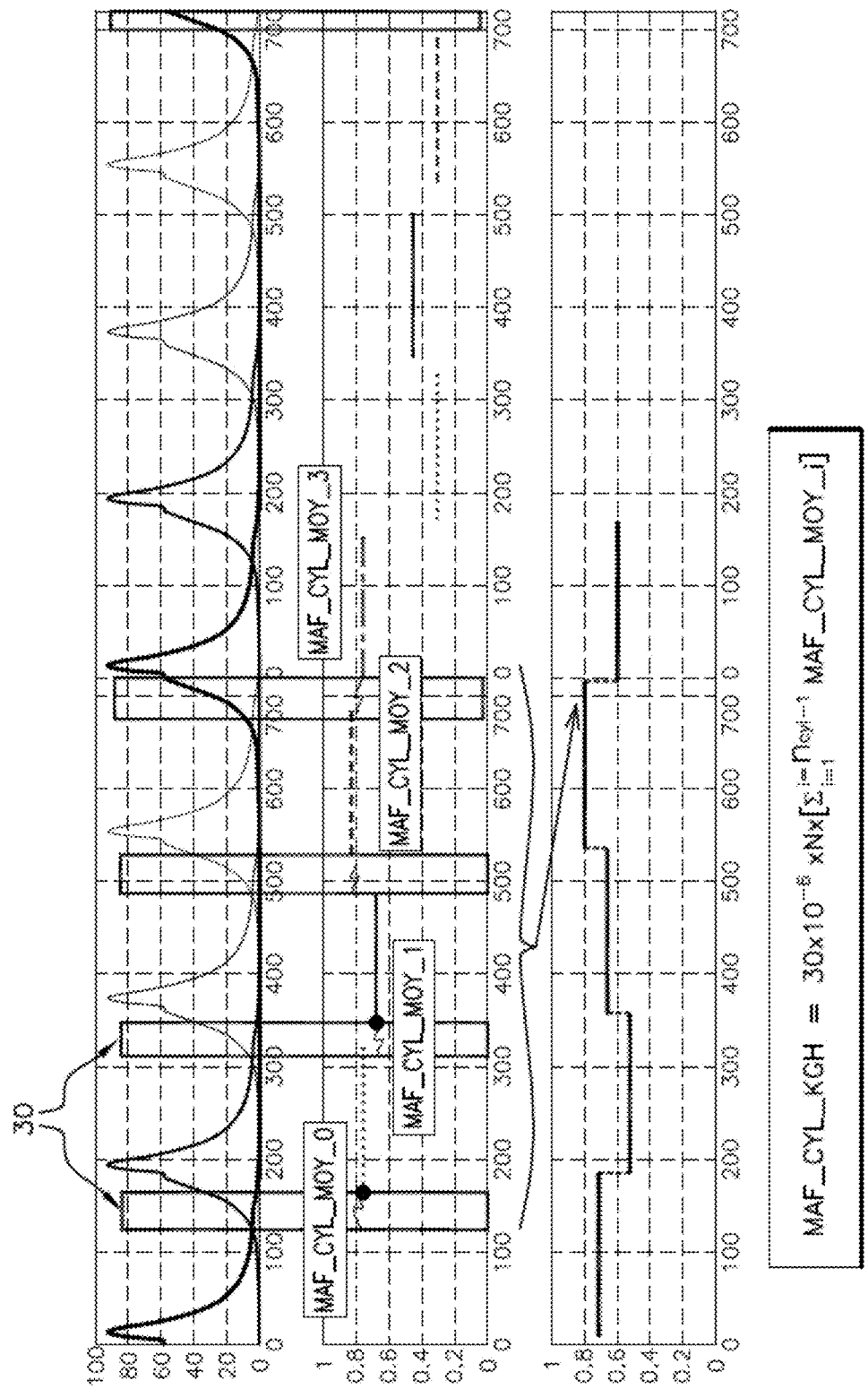
FIG. 4 is another illustration of a determination of the mass of gas in the cylinders of an engine.

FIG. 4 illustrates the method for obtaining the overall mass of gaseous mixture entering all the cylinders of the engine over a complete cycle of 720°. In the selected example in which the engine comprises four cylinders, four values MAF_CYL_MOY_i are obtained. By adding these values and multiplying this sum by a suitable coefficient of $30.10^{-6}$ N (N being the speed of rotation of the engine), a flow rate in kg/h is obtained corresponding to the flow rate of gaseous mixture passing through the engine. This flow rate is referred to as MAF_CYL_KGH.

In the manifold 10 a flow rate sensor 32 (FIG. 3) is conventionally provided which makes it possible to know the flow rate of fresh air entering the engine. This flow rate is referred to as MAF_KGH (see also FIG. 6). Knowing on the one hand the flow rate of the gaseous mixture passing into the cylinders and on the other hand the flow rate of fresh air entering the engine, the flow rate of the exhaust gases passing through the recirculation pipe 14 is deduced therefrom as the difference between the flow rate of the gaseous mixture passing into the cylinders and the flow rate of fresh air, that is to say:

MEGR_KGH=MAF_CYL_KGH−MAF_KGH

As illustrated in FIG. 3, so as not to have a negative flow rate, which could arise from a round-off error for example, the calculator calculates the difference between MAF_CYL_KGH and MAF_KGH and takes the value 0 if this difference is negative.

On the basis of these results, it is proposed to also calculate the oxygen content in the cylinders 2 before and after the combustion of fuel.

Figure 5:
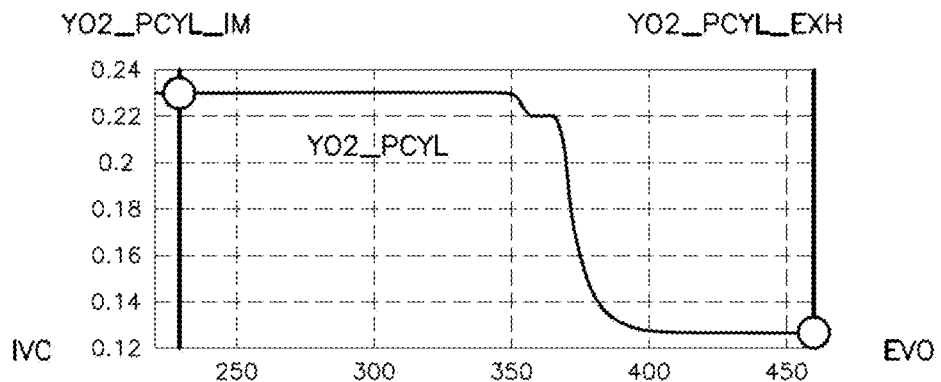
FIG. 5 is a schematic curve illustrating the oxygen content in a cylinder.

FIG. 5 illustrates a curve showing the development of the mass fraction of oxygen in a gaseous mixture during combustion. This content passes from a value YO2_PCYL_IM for a position crk=IVC of the engine before combustion in the cylinder in question to a value YO2_PCYL_EXH for a position crk=EVO of the engine after combustion. The position IVC preferably corresponds to the closure of the intake valve whereas the position EVO preferably corresponds to the open position of the exhaust valve.

Figure 6:
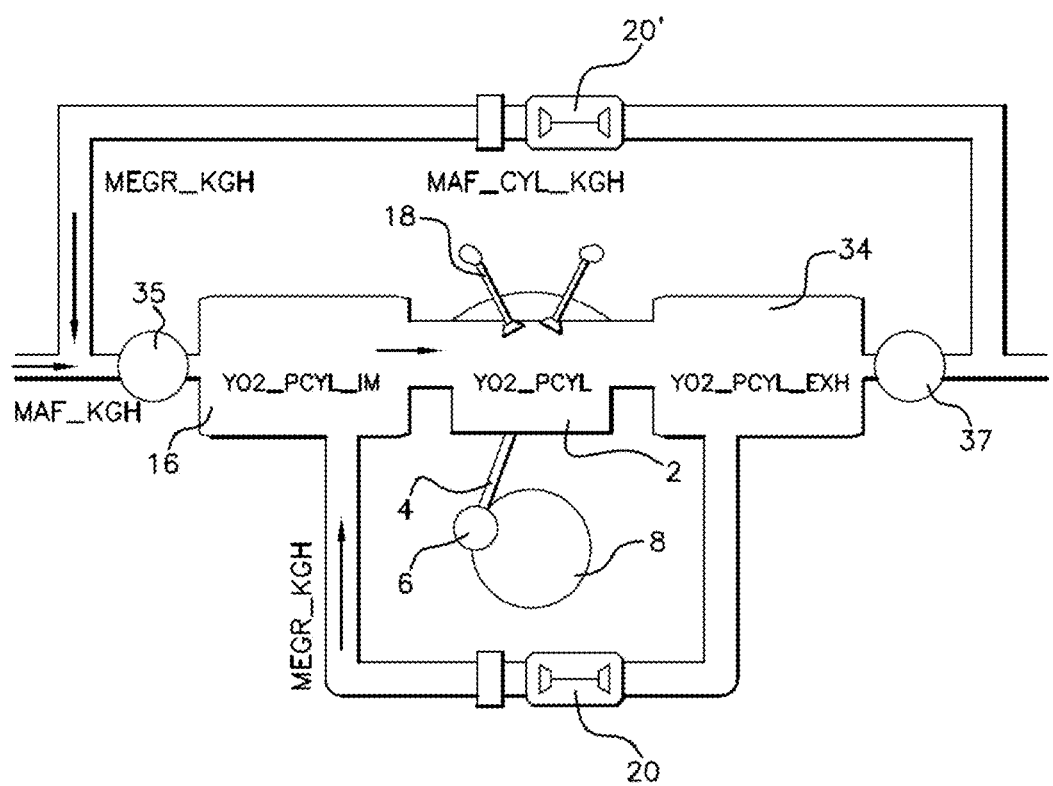
FIG. 6 is a partial schematic view of an engine illustrating the supply and the exhaust of said engine.

FIG. 6 is a variant of FIG. 1 which on the one hand shows a low-pressure recirculation circuit with a regulation valve 20' in addition to the high-pressure recirculation circuit already shown in FIG. 1 and on the other hand illustrates an exhaust manifold 34. This figure also shows a compressor 35 and a turbine 37, and also provides the various flow rates of gaseous mixtures that have been calculated with reference in particular to FIG. 3 as well as the oxygen contents in the intake manifold 16, in the cylinder 2 and in the exhaust manifold 34.

Figure 7:
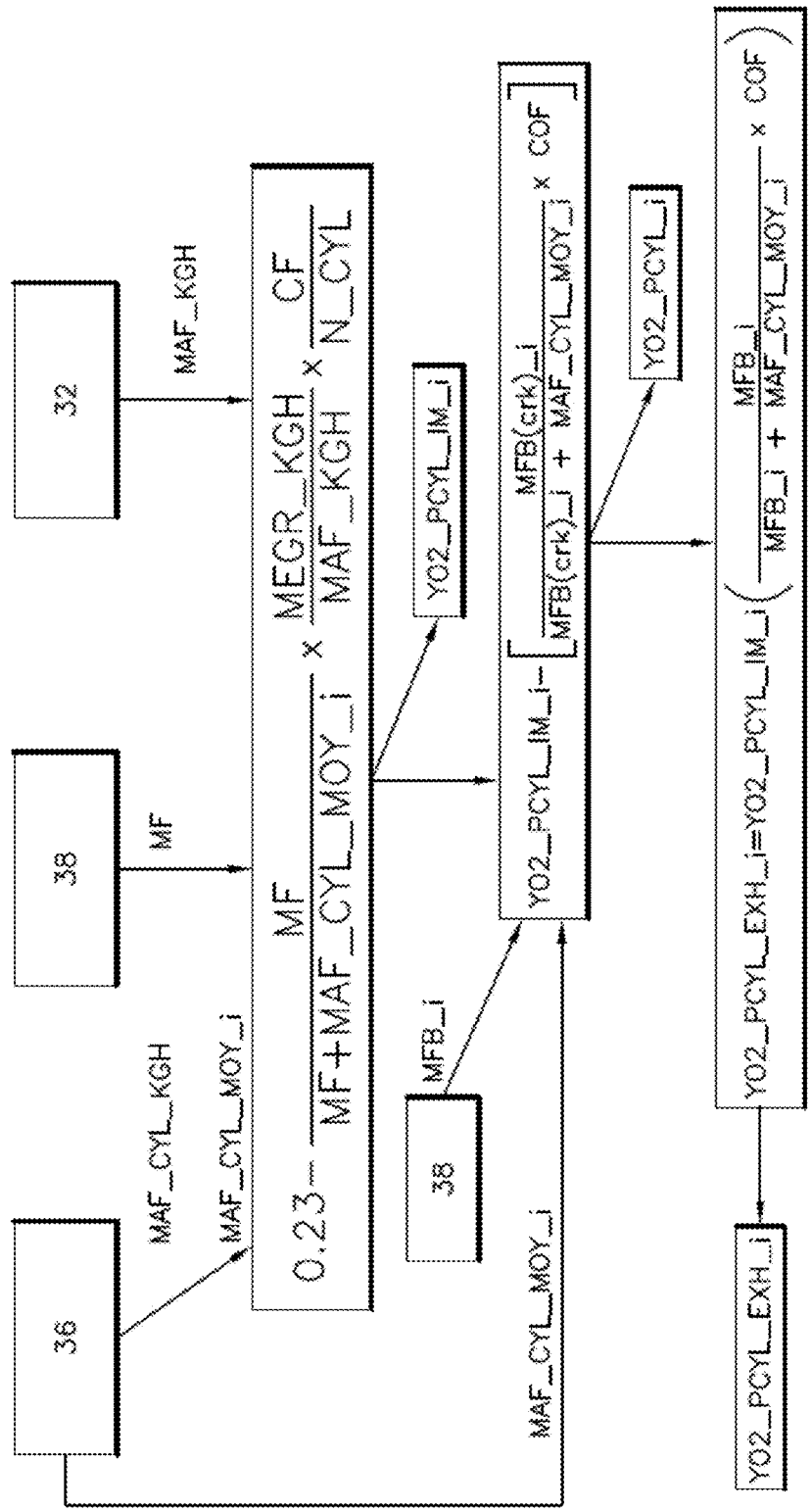
FIG. 7 illustrates a method for determining the rate of oxygen in a cylinder of an engine.

FIG. 7 illustrates the steps implemented in order to calculate the oxygen contents before and after combustion in the cylinder 2. In this figure the reference 36 denotes a calculation module for implementing the method illustrated in FIG. 3. This calculation module 36 in particular provides 36 the magnitude MAF_CYL_KGH and the magnitude MAF_CYL_MOY_i for each cylinder of the engine.

An injection module 38 for its part provides information concerning the quantity of injected fuel MF whereas the flow rate sensor 32, similarly to FIG. 3, provides the value MAF_KGH corresponding to the mass flow rate of fresh air entering the engine.

On the basis of this data it is thus possible to determine the mass fraction of oxygen in a given cylinder i before the start of combustion in this cylinder. If this oxygen content is denoted YO2_PCYL_IM_i, the following equation is given:

$$\text{YO2\_PCYL\_IM\_i} = \left(0.23 - \frac{MF}{MF + \text{MAF\_CYL\_MOY\_i}} \times \frac{\text{MEGR\_KGH}}{\text{MAF\_KGH}} \times \frac{CF}{\text{N\_CYL}}\right)$$

CF is the stoichiometric ratio of air/fuel for the fuel selected, and the other variables have already been defined before. There is reason to mention that the number of cylinders can be denoted indifferently by $n_{cyl}$ as indicated above or N_CYL as above.

It is also possible to determine the mass fraction of oxygen in a given cylinder i during the combustion of the fuel in this cylinder. The injection module 38 (shown a second time in FIG. 7 in order to limit the complexity of the linking lines) also provides here the quantity of fuel injected into each of the cylinders i. In other words, MFB_i is the quantity of fuel injected into the cylinder i. Since not all the fuel is injected at once, this quantity varies with the angular position of the engine. For a position crk of the engine, the quantity of fuel injected will be MFB(crk)_i.

In other words YO2_PCYL_i is then the mass fraction of oxygen in the cylinder i after the start of combustion and YO2_PCYL(crk)_i is this fraction at the angular position crk of the engine. The following equation is then given:

$$\text{YO2\_PCYL(crk)\_i} = \text{YO2\_PCYL\_IM\_i} - \left(\frac{\text{MFB(crk)\_i}}{\text{MFB(crk)\_i} + \text{MAF\_CYL\_MOY\_i}} \times COF\right)$$

where COF (or $C_{CO}$ as defined above) is the stoichiometric ratio of oxygen/fuel for the selected fuel and the other variables have already been defined before.

At the end of combustion, when crk=EVO (FIG. 5), the following is given:

$$\text{YO2\_PYCL\_EXH\_i} = \text{YO2\_PCYL\_IM\_i} - \left(\frac{\text{MFB\_i}}{\text{MFB\_i} + \text{MAF\_CYL\_MOY\_i}} \times COF\right)$$

with YO2_PCYL_EXH_i being the mass fraction of oxygen of the gaseous mixture rejected by the cylinder i in the exhaust manifold 34.

As will become clear from the rest of the description below, it becomes possible by knowing the pressure in the cylinders to know on the one hand the quantity of exhaust gas contained in a cylinder and on the other hand to know the oxygen content in the engine.

The present invention thus makes it possible to better know the flow rates of air in the cylinders of the engine as well as the flow rates at an exhaust gas recirculation system. The information concerning the exhaust gas recirculation flow rate is obtained independently of the knowledge of the open position of the EGR valve. The concentration of the gaseous mixture at the intake manifold and at the exhaust manifold is also obtained independently of information concerning the opening of the EGR valve(s).

For this reason it is possible to better control the recirculation of the exhaust gases, whether this is a low-pressure and/or high-pressure recirculation. This improved control is also favorable in order to better manage the consumption of the engine.

The knowledge of the oxygen content is for its part very useful for better managing the polluting emissions of the engine, in particular the $NO_x$ emission.

In the description above it has been assumed that each cylinder of the engine in question was equipped with a pressure sensor measuring the pressure within the corresponding combustion chamber. However, it would appear to a person skilled in the art that if only one cylinder is equipped with such a sensor, the present invention could also be implemented by extrapolating the measurements taken in one combustion chamber for the other cylinders.

Of course, the present invention is not limited to the preferred embodiment described above by way of non-limiting example or to the variants discussed. The invention also relates to all embodiments and variants thereof within the capabilities of a person skilled in the art.

The invention claimed is:

1. A method for determining a waste gas recirculation flow rate in a flow of air in an internal combustion engine comprising at least one cylinder (2) equipped with a pressure sensor (22), said engine comprising at least one waste gas recirculation circuit as well as means (32) to measure the flow rate of fresh air introduced into the engine, wherein the method comprises the following steps:
measuring pressure in each cylinder during a compression phase whilst no quantity of gas can enter or exit from said cylinder and before fuel is injected into said cylinder,
determining mass of gas present in each cylinder based on a quotient having a numerator calculated by multiplying the pressure measured in the cylinder with both a variation of volume in the cylinder and a corrective term and a denominator calculated by multiplying variation of temperature in the cylinder with heat capacity at a constant volume of the mass of gas according to the following formula:

$$\text{MAF\_CYL} = \left[Pcyl \times \frac{dV}{d(crk)} \times \frac{\alpha - 1}{CV}\right] / \frac{dTcyl}{d(crk)}$$

where:
MAF_CYL is the mass of gas in the cylinder,
Pcyl is the pressure measured in the cylinder,
dV/d(crk) is the variation of volume in the cylinder for an angular variation of a crankshaft equal to d(crk),
dTcyl/d(crk) is the variation of temperature in the cylinder for an angular variation of a crankshaft equal to d(crk),
CV is the heat capacity at constant volume of the mass of gas,
α−1 is said corrective term representing heat losses taken into consideration,
determining the mass of gas present in all cylinders of the engine over a full combustion cycle,
determining the mass of gas corresponding to the recycled exhaust gas from the difference between the determined mass of gas in all cylinders of the engine over a full combustion cycle and a mass of fresh air measured from said full combustion cycle.

2. A device for determining an exhaust gas recirculation flow rate in an air flow in an internal combustion engine comprising at least one cylinder (2) equipped with a pressure sensor (22), said engine comprising at least one exhaust gas recirculation circuit as well as means (32) to measure the flow rate of fresh air introduced into the engine, wherein said device comprises means for implementing each of the steps of a method as claimed in claim 1.

3. The determination method as claimed in claim 1, wherein the pressure is measured during a compression phase of the gas in a range of angular rotation of the engine between 60° and 40° before the top dead center corresponding to the end of the compression phase.

4. The determination method as claimed in claim 1, wherein the pressure is measured during a compression phase of the gas, in a range of angular rotation of the engine between 70° and 30° before the top dead center corresponding to the end of the compression phase.

5. The determination method as claimed in claim 4, wherein the mass of gas in a cylinder is determined by taking a number of measurements of pressure at different angular positions of the engine and by calculating the arithmetic mean of the results corresponding to the measurements taken.

6. The determination method as claimed in claim 4, wherein the corrective term used for the calculation of the mass of gas in a cylinder is a function of rotation speed of the engine and of temperature of the engine.

7. The determination method as claimed in claim 4, further comprising a step of determining oxygen content of the gas in the engine.

8. The determination method as claimed in claim 1, wherein the mass of gas in a cylinder is determined by taking a number of measurements of pressure at different angular positions of the engine and by calculating the arithmetic mean of the results corresponding to the measurements taken.

9. The determination method as claimed in claim 8, wherein the corrective term used for the calculation of the mass of gas in a cylinder is a function of rotation speed of the engine and of temperature of the engine.

10. The determination method as claimed in claim 8, further comprising a step of determining oxygen content of the gas in the engine.

11. The determination method as claimed in claim 1, wherein the corrective term used for the calculation of the mass of gas in a cylinder is a function of rotation speed of the engine and of temperature of the engine.

12. The determination method as claimed in claim 11, further comprising a step of determining oxygen content of the gas in the engine.

13. The determination method as claimed in claim 1, further comprising a step of determining oxygen content of the gas in the engine.

14. The determination method as claimed in claim 13, wherein the step of determining the oxygen content of the gas in the engine comprises determining a mass fraction of oxygen in the gas in a cylinder at the end of the combustion cycle by the following formula:

$$YO2EX_{cyl} = YO2_{cyl} - \left( \frac{MF}{MF + MAF} \times C_{OF} \right)$$

where:
$YO2_{cyl}$ is the mass fraction of oxygen in the cylinder in question before the start of the combustion,
MF is total mass of fuel injected into the cylinder,
MAF is total mass of gases in the cylinder, and
$C_{OF}$ is the stoichiometric ratio of oxygen/fuel for a selected fuel.

15. The determination method as claimed in claim 13, wherein the step of determining the oxygen content of the gas in the engine comprises determining a mass fraction of oxygen in the gas in a cylinder before the start of combustion the following formula:

$$YO2IN_{cyl} = 0.23 - \left( \frac{MF}{MF + MAF_{cyl}} \times C_F \times \frac{MEGR_{kgh}}{MAF_{kgh}} \times \frac{1}{n_{cyl}} \right)$$

where:
MF is total mass of burned fuel,
$MAF_{cyl}$ is the mass of gas in the cylinder,
$C_F$ is the stoichiometric ratio of air/fuel for a selected fuel,
$MEGR_{kgh}$ is gaseous flow rate in the exhaust gas recirculation system,
$MAF_{kgh}$ is flow of fresh air measured at the inlet of the engine, and
$n_{cyl}$ is the number of cylinders of the engine.

16. The determination method as claimed in claim 15, wherein the step of determining the oxygen content of the gas in the engine comprises determining a mass fraction of oxygen in the gas in a cylinder at the end of the combustion cycle by the following formula:

$$YO2EX_{cyl} = YO2_{cyl} - \left( \frac{MF}{MF + MAF} \times C_{OF} \right)$$

where:
$YO2_{cyl}$ is the mass fraction of oxygen in the cylinder in question before the start of the combustion,
MF is total mass of fuel injected into the cylinder,
MAF is total mass of gas in the cylinder, and
$C_{OF}$ is the stoichiometric ratio of oxygen/fuel for a selected fuel.

* * * * *